No. 869,894. PATENTED NOV. 5, 1907.
E. GODWIN.
APPARATUS FOR RAISING AND LOWERING POLES.
APPLICATION FILED AUG. 19, 1907.
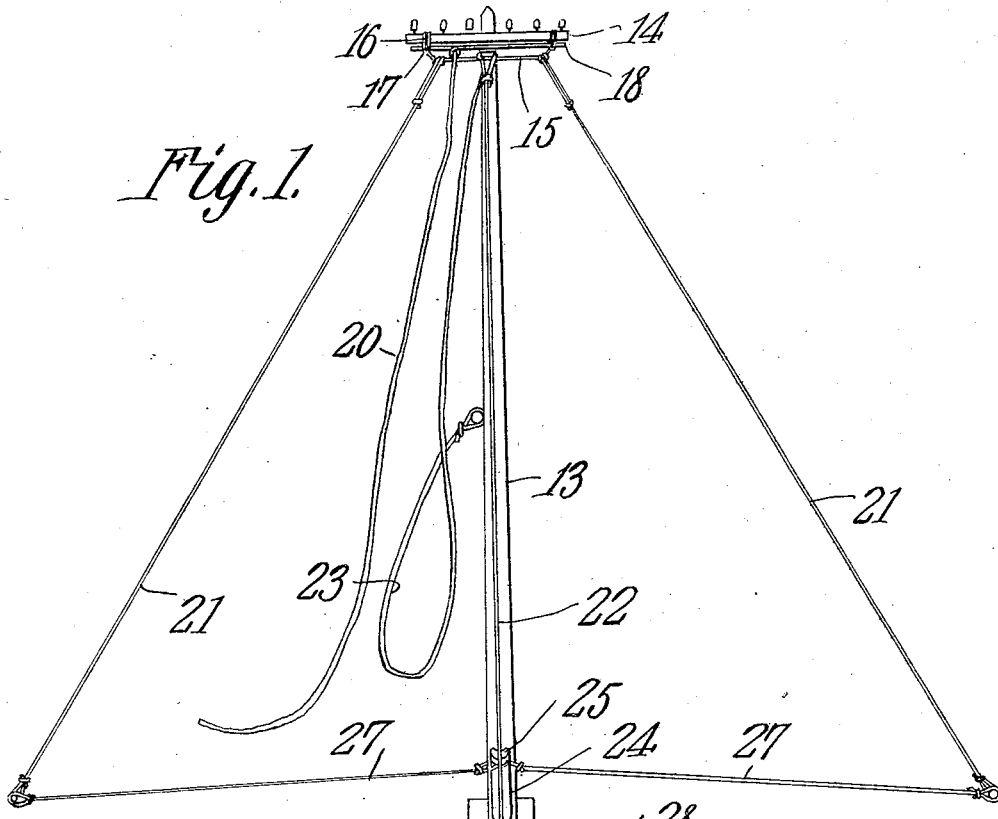
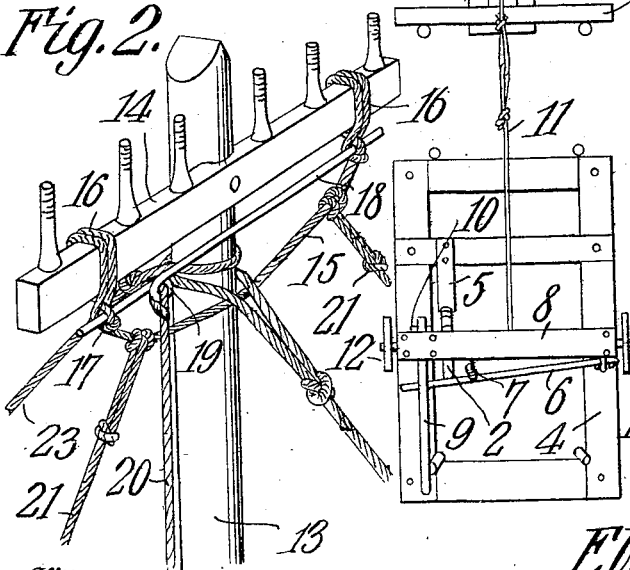
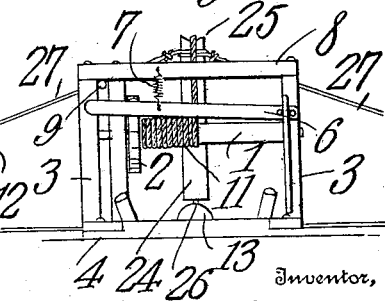
Inventor,
Ellis Godwin,
By C.A. Snow & Co
Attorneys

UNITED STATES PATENT OFFICE.

ELLIS GODWIN, OF CONCORD, NORTH CAROLINA.

APPARATUS FOR RAISING AND LOWERING POLES.

No. 869,894.                     Specification of Letters Patent.                     Patented Nov. 5, 1907.

Application filed August 19, 1907. Serial No. 389,279.

*To all whom it may concern:*

Be it known that I, ELLIS GODWIN, a citizen of the United States, residing at Concord, in the county of Cabarrus and State of North Carolina, have invented a new and useful Apparatus for Raising and Lowering Poles, of which the following is a specification.

This invention has relation to apparatus for raising and lowering poles and it consists in the novel construction and arrangement of its parts as hereinafter shown and described.

The object of the invention is to provide an apparatus which may be effectually used for raising poles and placing them in suitable holes previously dug in the ground. If, after the pole is raised, it should be desired to lift the pole out of the hole this may be readily done by arranging the apparatus and operating the same, as will hereinafter appear.

The apparatus consists of a winding drum upon which a tackle is adapted to be wound and which is provided with a series of operating levers, of peculiar arrangement. A rigging is used in connection with the said winding drum which is adapted to be attached to the pole for the purpose of moving the same from a horizontal to a vertical position. Said rigging is so arranged that it may be detached from the upper portion of the pole by one standing on the ground and thus avoiding the necessity of climbing the pole for the purpose of removing the rigging.

In the accompanying drawing:—Figure 1 is a plan view of the apparatus about to erect a pole. Fig. 2 is a perspective view of the upper portion of the pole showing the arrangement of the rigging thereon, and Fig. 3 is a rear elevation of the apparatus.

The apparatus consists of the drum 1 which is provided at one end with a ratchet wheel 2. Said drum is journaled between the uprights 3, which are arranged in pairs and located at the opposite side of the platform 4. The spring pawl 5 is mounted upon the platform 4 and engages the ratchet wheel 2 to prevent reverse turning of the same. The lever 6 is fulcrumed to one of the uprights 3 and extends transversely across the periphery of the ratchet wheel 2. The spring 7 is attached at its lower end to the free end portion of the lever 6 and at its upper end to the cross piece 8 which connects the upper end of the uprights 3 together. The lever 9 lies between the space between the uprights 3, 3 at that side of the platform 4 over which the free end of the lever 6 is located. The lever 9 is provided with a cross pin 10 which bears against the edges of the adjacent uprights 3 and forms a fulcrum upon which the lever 9 swings. The tackle 11 is arranged to wind upon the drum 1.

From the foregoing description it is obvious that as the lever 9 is swung vertically the lever 6 which is in contact with the lower edge of the lever 9 will also swing vertically. The said lever 6 being forced down by the downward movement of the lever 9 and being elevated as the lever 9 moves up by the springs 7, the tension of which was increased by the downward movement of the lever 6. When the lever 5 moves down it engages one of the ratchets of the wheel 2 and partially rotates the said wheel and the attached winding drum 1. Thus the tackle 11 is wound upon the drum 1 through the instrumentality of a plurality of coöperating levers. For transportation purposes the platform 4 may be mounted upon wheels 12 which are removed from the platform when the same is placed upon the ground to be used for drawing the tackle to elevate a pole.

The pole 13 is provided with the usual cross arm 14 carried by telegraph or telephone poles and the rigging for guiding the pole into an upright position consists of a series of guides and attached ropes of peculiar arrangement. The head rope 15 is provided at its end with loops 16 which are carried around the ends of the cross arm 14 and then the end portions of the head rope 15 are inserted laterally through the loops 16, as at 17. The ends of the latch bar are then inserted between the sides of the loops 16 and the portions of the head rope 15 inserted therethrough and said latch bar 18 lies directly under the cross arm 14 and is provided at its middle with an eye 19. The rope 20 is attached at one end to the eye 19 and is of sufficient length to have its opposite ends in the vicinity of the ground when the pole 13 is in erect position. The head rope 15 extends transversely across the pole 13 in the vicinity of the latch bar 18 and cross-arm 14. The guy ropes 21, 21 are attached to the head rope 15 at points on opposite sides of the pole 13. The tow-line 22 is looped at one end around the pole 13 between the head rope 15 and the cross-arm 14. The opposite end of the tow-line 22 is connected to the tackle 11. The guy-rope 23 is looped about the pole 13 between the loops of the tow-line 22 and the cross-arm 14. The prop 24 is provided at its upper end with a crotch 25 and at its lower end with a pointed spike 26. The guy ropes 27, 27 are attached to the upper portion of the prop 24 and are adapted to be secured to stakes driven in the ground at opposite sides of the hole in which the pole 13 is to be erected.

The operation of erecting the pole is as follows:—A timber 28, or other abutment, is staked, or otherwise secured to the ground at the edge of the hole in which the pole 13 is to be erected. The butt end of the said pole is placed against the said abutment and the platform 4 is located upon the ground at the opposite side of the said abutment and is secured in position by means of stakes or suitable guy ropes. The spike 26 of the prop 24 is then driven in the butt end of the pole 13 so that the said prop will be slightly inclined away from the platform 4 and toward the opposite end of the pole 13. The guy-ropes 27 are then secured to stakes driven in the ground substantially in alinement with the butt end of the pole 13 and at opposite sides thereof. The ends of the guy-ropes 21, 21 are secured to the same stakes to which the guy-ropes 27, 27 are attached. The guy-rope 23 is secured to a stake or other fixed object located on the opposite side of the pole hole from the platform 4, said guy-rope 23 having sufficient slack to permit the pole 13 to assume an erect position but to prevent the pole from falling over toward the platform 4. The tow-line 22 is then placed in the crotch 25 of the prop 24 and connected up with the tackle 11. The tackle 11 is then wound upon the drum 1 and the pole 13 is raised from a horizontal position into an erect position with its butt end in the hole previously dug in the ground for the reception thereof. During the process of erecting the pole the guy-ropes 21 prevent the pole from swinging laterally while the guy-rope 23 will retain the pole from falling toward the winding drum while the tow-line 22 will retain the pole from movement toward the guy-rope 23. Thus the upper end of the pole is guyed from four directions and the pole is securely held in an upright position. It is, of course, understood that when the pole has been sufficiently elevated so that the tow-line 22 will assume a straight line between its point of attachment with the pole and the winding drum 1 that the prop 24 is removed from the butt end of the pole. After the pole has been brought to an erect position, should it be desired to raise the same out of a hole in the ground, a prop is placed alongside of the pole and the tow-line 22 is passed over the upper end of said prop and is secured to the base portion of the pole. By then winding the drum 1 the said tow-line will be moved toward the drum and the pole will be elevated out of the hole in the ground.

When the pole has been brought to an erect position the rigging, as above described may be entirely removed from the same without necessitating an operator to climb the pole. This is done through the instrumentality of the rope 20 which is given a jerk at one side of the pole and which moves the latch bar 18 longitudinally so that one of its ends will pass from between one of the loops 16 and that portion of the head-rope 15 projecting through said loop. Thus the said loop of the head-rope being relieved of its securing means will disengage the cross-arm 14 and by giving the rope 20 a second jerk the opposite end of the latch bar 18 will be withdrawn from between the other loop 16 and that portion of the head-rope 15 projecting therethrough, when the latch bar and the head rope will fall to the ground. At the same time the tow-line 22 and guy-rope 23 are relieved of support and they too will fall to the ground.

Having described my invention what I claim as new and desire to secure by Letters-Patent is:—

1. An apparatus of the character indicated comprising a rigging consisting of a head-rope having loops at its ends, a latch-bar adapted to be inserted between portions of the head-rope inserted through the said loops and the said loops, a pendent rope attached to the latch-bar, guy-ropes attached to the end portions of the head-rope, said head-rope adapted to be secured at its looped end to the cross-arm of a pole, a guy rope looped around the pole between the head-rope and the cross-bar, a tow-line looped around the pole between the head-rope and the cross-arm, a prop located upon the pole and a winding drum journaled for rotation and having a tackle operatively connected to the said tow-line.

2. An apparatus of the character indicated comprising a rigging adapted to be attached to the cross-arm of a pole and having suitable guy-ropes, a tow-line held in position upon the pole by the rigging, and means for removing the rigging from the pole, a means for drawing the tow-line consisting of a drum mounted for rotation, a ratchet wheel rotating with said drum, a tackle winding upon the drum and being connected with the tow-line, uprights located at opposite ends of the drum, a cross-piece connecting said uprights together, a lever fulcrumed to one of the uprights and passing transversely across the periphery of the ratchet wheel, a spring for supporting the free end of the said lever in an elevated position, a second lever passing through the spaces between the uprights and having a cross-pin which bears against the edges of the said uprights, said second lever resting upon the upper edge of the first said lever, and a pawl adapted to hold said ratchet wheel against reverse rotation.

In testimony that I claim the foregoing as my own, I have hereto affixed my signature in the presence of two witnesses.

ELLIS GODWIN.

Witnesses:
J. O. MOOSE,
W. E. WATKINS.